UNITED STATES PATENT OFFICE.

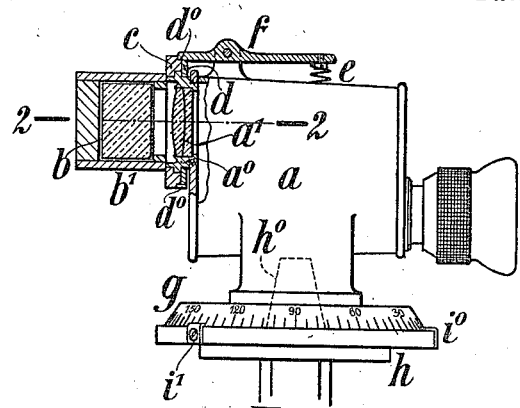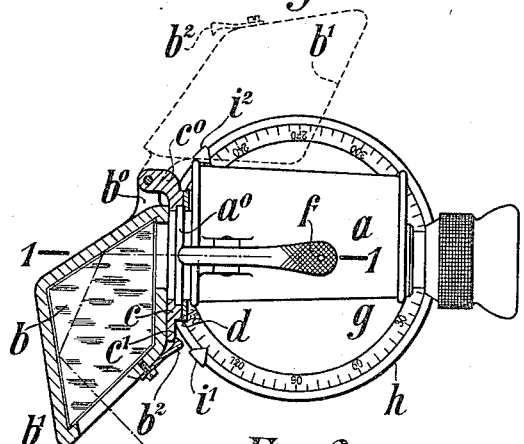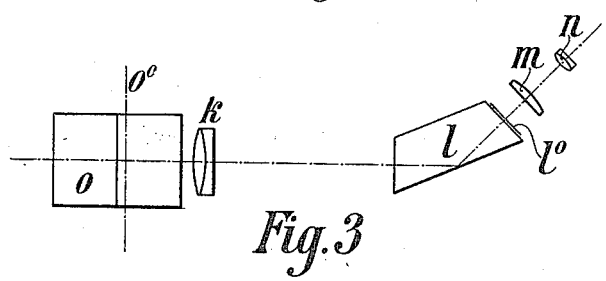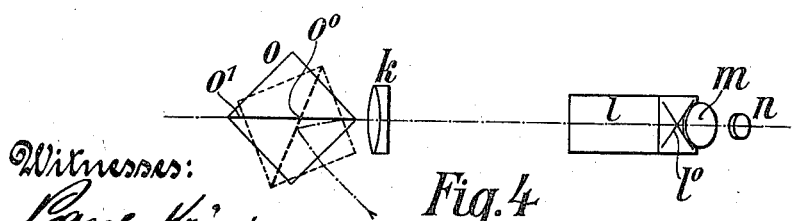

OTTO FORSTMANN, OF JENA, GERMANY, ASSIGNOR TO THE FIRM OF CARL ZEISS, OF JENA, GERMANY.

TELESCOPIC SIGHT FOR ORDNANCE.

1,030,070.   Specification of Letters Patent.   Patented June 18, 1912.

Application filed February 28, 1908. Serial No. 418,255.

*To all whom it may concern:*

Be it known that I, OTTO FORSTMANN, a citizen of the German Empire, and residing at Carl-Zeiss strasse, Jena, in the Grand Duchy of Saxe-Weimar, Germany, have invented a new and useful Telescopic Sight for Ordnance, of which the following is a specification.

The object of the invention is a telescopic sight for ordnance similar to that of Patent 835,625. The rotatable telescopic sight according to this older patent comprises a telescopic system, by means of which the layer is enabled to take advantage of two sets of rays, entering the instrument from two opposite directions, without alteration of the direction of the emerging rays, hence without alteration of the direction of vision. With this system he can sweep the whole horizon and consequently aim at any auxiliary object whatever instead of at the object proper, without having to alter the direction of his vision through a greater angle than 90° in the horizontal plane from the main direction. The specification of the patent also correctly says, that the layer can follow an alteration in the direction of vision through a quadrant at most toward the right and toward the left without leaving his place. Experience has, however, in the meanwhile shown, that following a full right angle is attended with some inconvenience, which under certain circumstances can prejudice fine sighting. On that account the fundamental idea of the invention cited—namely, to apportion the horizon to more than one telescope, in order to sweep it with less than a half right and half left rotation of the sight—is according to the present improvement carried into effect by a triple telescopic system, which reduces the rotation of the sight and hence of the direction of vision necessary to less than 90° toward each side. The three axes of the entering rays in this case form three angles of which each is less than 180°. The three axes of the emerging rays coincide in the new telescopic sight. A telescopic system having these features can be composed of a direct or parallel vision telescope and of a double reflecting prism of more than 90° and less than 180° deflection. To the end in view the additional prism must be arranged in front of the objective, so that it can on the one hand be changed over from the one horizontal position to the other, and on the other hand be moved entirely aside. Through changing over the prism the axis of entrance of the rays is transferred from left to right and inversely, and through moving the prism aside the axis of the objective is made the axis of entrance. The combination of a simple reflecting prism with a telescope can also furnish a telescopic system having the desired features, provided that the telescope is image-erecting only in the vertical plane. The additional prism likewise arranged in front of the objective has the principal section horizontal and is rotatable about a vertical axis. To the three requisite directions of the axis of entrance there correspond in that case three different situations, in which the prism can be secured. If one of these directions coincide with the direction of the axis of the objective, a well known simple reflecting double prism can be employed. By this last arrangement the telescopic system can take a symmetrical shape, which renders the manufacture cheaper and the manipulation more convenient.

In the annexed drawing: Figure 1 is a side view partly in section of a telescopic gun sight constructed according to the invention. Fig. 2 is a plan view partly in section of the telescopic sight according to Fig. 1 after having taken away the cover of the prism mount. Fig. 3 is a side view of the optical parts of a second telescopic sight constructed according to the invention. Fig. 4 is a plan view of the same optical parts.

Referring to Figs. 1 and 2, the telescope $a$ is a prism telescope of the ordinary type. The additional prism $b$ affords two total reflections of like sign. The axis of the rays enters the prism normally and after a total deflection through an angle of 135° passes out of the prism normally. The prism is connected by a hinge part $b^0$ of its mount $b^1$ with the hinge part $c^0$ of a double ring $c\ d$, which sits rotatably on the mount $a^0$ of the objective $a^1$. A spring catch $b^2$ works in conjunction with the nose $c^1$ of the ring part $c$, so that the prism can only be moved about the axis of the hinge $b^0\ c^0$, from the operative position shown in full lines by the application of some force. If this movement be continued far enough, for instance, until the mount $b^1$ of the prism has taken up the position indicated by a dotted outline, the prism has become inoperative and the telescope with a left and rearward direction of view is replaced by another telescope having its direction of view ahead. If, however, it be desired to change the position of the prism as drawn in full lines to the other horizontal and operative position, in which sighting is performed with a telescope with a right and rearward direction of view, by pressing on the end of the lever $f$, supported by the spring $e$, so as to disengage it from a notch $d^0$, the ring $c\,d$ is released and then turned together with the prism casing $b^1$ hinged to it, until the lever $f$ snaps into another notch $d^0$. The casing of the telescope is firmly fixed upon the scale disk $g$ rotatably mounted on the pivot $h^0$ of the fixed base $h$. This base of the gun sight carries three indices $i^0$, $i^1$ and $i^2$ for allowing direct reading with each of the three telescopes.

In Figs. 3 and 4 the telescope is constructed for inspection in a downward sloping direction and is composed of the objective $k$, the simple reflecting prism $l$ provided with a reticle $l^0$ and the Ramsden ocular $m\,n$. The image is erected in the vertical plane by the reflection of the rays in the prism $l$. Erection in the horizontal plane is effected by the rotatable prism $o$ placed in front of the objective $k$. This additional prism is a simple reflecting double prism, $i.\,e.$, a combination of two simple reflecting prisms with a reflecting layer between the two reflecting surfaces cemented together. The axis of rotation $o^0$ of the prism $o$ lies in the reflecting layer $o^1$ of this prism perpendicular to the principal section and at the same time in the vertical plane which includes the axis of the objective $k$ and in one position of the prism is the plane of the reflecting layer $o^1$. This position of the prism $o$, shown in full lines in Fig. 4, corresponds to that of the three telescopes having its direction of view ahead, the axis of entrance coinciding with the axis of the objective. In this position, as is well known, the double prism has no other effect than a simple one with the same direction of the reflecting surface, no final deflection of the axis being produced. It is in this example also supposed that the deflection to be given the direction of entrance for producing the two telescopes with left and right rearward directions of view amounts to 135° toward each side. To obtain these deflections the double prism must be rotated into its left and right end positions of which the left one is indicated on Fig. 4 by dotted lines. As will be seen from the said figure, in such an end position of the prism $o$ only one of its components is operative. The two last mentioned positions of the prism are symmetrical with respect to the one first described, and this symmetrical optical arrangement is due to the use of a double prism instead of a simple one. It allows of a symmetrical mechanical arrangement being constructed.

I claim:

1. In a telescopic gun sight for ordnance a telescopic system the front part of which is reflecting, means for setting this front part in three positions, each of which differs from either of the two others by an inclination of less than 180° between the entrance axes, a carrier for the telescopic system, a base on which the carrier is mounted so as to be rotatable in a horizontal plane, and means for indicating the angular position of the entrance axis relatively to the base.

2. In a telescopic gun sight for ordnance a telescopic system consisting of a telescope and a reflecting prism placed in front of it, means for setting this prism in three positions, in one of which positions the entrance axis of the telescopic system coincides with that of the telescope, and in either of the other two of which positions the entrance axis of the telescopic system is deflected from that of the telescope by more than 90° and less than 180° to the left and right hand respectively, a carrier for the telescopic system, a base on which the carrier is mounted so as to be rotatable in a horizontal plane, and means for indicating the angular position of the entrance axis relatively to the base.

3. In a telescopic gun sight for ordnance a telescopic system consisting of a telescope and a double reflecting prism of more than 90 and less than 180° deflection, means for setting this prism in front of the telescope in three different positions: with the entrance surface toward the left, with this surface toward the right and thirdly aside from the entrance opening of the telescope, a carrier for the telescopic system, a base on which the carrier is mounted so as to be rotatable in a horizontal plane, and means for indicating the angular position of the entrance axis relatively to the base.

4. In a telescopic gun sight for ordnance a telescope, a ring rotatably mounted on the front part of the telescope, means for securing the ring in two opposite positions, a casing hinged to the ring, a double reflecting prism of more than 90 and less than 180° deflection fitted in the casing, a carrier for the telescope, a base on which the carrier is mounted so as to be rotatable in a horizontal plane, and means for indicating the angular position of the entrance axis relatively to the base.

OTTO FORSTMANN.

Witnesses:
PAUL KRUGER,
FRITZ SANDER.